US012334560B2

(12) United States Patent
Yachi et al.

(10) Patent No.: US 12,334,560 B2
(45) Date of Patent: Jun. 17, 2025

(54) FIBROUS-CARBON-CONTAINING ACTIVE MATERIAL LAYER FOR ALL-SOLID LITHIUM SECONDARY BATTERY AND ALL-SOLID LITHIUM SECONDARY BATTERY

(71) Applicant: Teijin Limited, Osaka (JP)

(72) Inventors: Kazuki Yachi, Osaka (JP); Shinya Komura, Osaka (JP); Takahiro Daido, Osaka (JP)

(73) Assignee: TEIJIN LIMITED, Osaka (JP)

( * ) Notice: Subject to any disclaimer, the term of this patent is extended or adjusted under 35 U.S.C. 154(b) by 731 days.

(21) Appl. No.: 17/622,600

(22) PCT Filed: Jun. 26, 2020

(86) PCT No.: PCT/JP2020/025113
§ 371 (c)(1),
(2) Date: Dec. 23, 2021

(87) PCT Pub. No.: WO2020/262566
PCT Pub. Date: Dec. 30, 2020

(65) Prior Publication Data
US 2022/0359881 A1 Nov. 10, 2022

(30) Foreign Application Priority Data
Jun. 28, 2019 (JP) ................................ 2019-122507
Aug. 21, 2019 (JP) ................................ 2019-151605

(51) Int. Cl.
*H01M 4/62* (2006.01)
*H01M 10/0525* (2010.01)
*H01M 4/02* (2006.01)

(52) U.S. Cl.
CPC ....... *H01M 4/625* (2013.01); *H01M 10/0525* (2013.01); *H01M 2004/021* (2013.01)

(58) Field of Classification Search
CPC ............. H01M 4/625; H01M 10/0525; H01M 2004/021; H01M 4/36; H01M 2300/0068; H01M 4/13; H01M 4/62; H01M 10/052; H01M 10/0562; H01M 10/0565; H01M 2300/0065; Y02E 60/10
See application file for complete search history.

(56) References Cited

U.S. PATENT DOCUMENTS

| 2015/0372309 A1 | 12/2015 | Yachi et al. | |
| 2016/0336617 A1* | 11/2016 | Yamazaki | H01M 10/0525 |
| 2017/0098822 A1 | 4/2017 | Yachi et al. | |
| 2018/0301689 A1 | 10/2018 | Ose et al. | |
| 2019/0173082 A1* | 6/2019 | Zhamu | H01M 4/40 |
| 2019/0214629 A1 | 7/2019 | Andre et al. | |
| 2019/0221832 A1* | 7/2019 | Wakasugi | H01M 10/0525 |
| 2019/0305368 A1 | 10/2019 | Mizutan, I et al. | |
| 2021/0143427 A1 | 5/2021 | Yachi et al. | |

FOREIGN PATENT DOCUMENTS

| JP | 2010-244911 A | 10/2010 |
| JP | 2010-262764 A | 11/2010 |
| JP | 2016-009679 A | 1/2016 |
| JP | 2016-039146 A | 3/2016 |
| JP | 2017-63013 A | 3/2017 |
| JP | 2018-181706 A | 11/2018 |
| JP | 2019-185897 A | 10/2019 |
| KR | 10-2017-0050234 A | 5/2017 |
| WO | 2014/115852 A1 | 7/2014 |
| WO | 2016/157348 A1 | 10/2016 |
| WO | 2017/135406 A1 | 8/2017 |

OTHER PUBLICATIONS

Showa Denko K.K., "VGCF™-H", retrieved from internet on Dec. 2, 2020, URL: https://www.sdk.co.jp/products/45/74/1327.html and https://www.sdk.co.jp/english/products/126/132/2094.html (English), 4 pages.
International Search Report of PCT/JP2020/025113 dated Aug. 25, 2020 [PCT/ISA/210].

* cited by examiner

*Primary Examiner* — Muhammad S Siddiquee
(74) *Attorney, Agent, or Firm* — Sughrue Mion, PLLC

(57) ABSTRACT

The present invention provides an active material layer for an all-solid-state lithium secondary battery including at least an active material, a conductive aid, and a solid electrolyte, in which the active material layer has a gap, a ratio of the conductive aid in the active material layer is 0.1% by mass or more and less than 5.0% by mass, the conductive aid contains fibrous carbon having an average fiber diameter of 10 to 900 nm, and a ratio of the fibrous carbon in the conductive aid is 20% by mass or more.

12 Claims, No Drawings

FIBROUS-CARBON-CONTAINING ACTIVE MATERIAL LAYER FOR ALL-SOLID LITHIUM SECONDARY BATTERY AND ALL-SOLID LITHIUM SECONDARY BATTERY

CROSS REFERENCE TO RELATED APPLICATIONS

This application is a National Stage of International Application No. PCT/JP2020/025113 filed on Jun. 26, 2020, claiming priority based on Japanese Patent Application No. 2019-122507 filed on Jun. 28, 2019 and Japanese Patent Application No. 2019-151605 filed on Aug. 21, 2019.

TECHNICAL FIELD

The present invention relates to an active material layer for an all-solid-state lithium secondary battery including fibrous carbon, and an all-solid-state lithium secondary battery including the active material layer and a solid electrolyte.

BACKGROUND ART

An active material layer of an all-solid-state lithium secondary battery includes at least an active material and a solid electrolyte. By adding a conductive aid to the active material layer to improve electron conductivity, an increase in resistance is suppressed. As the conductive aid, a fibrous carbon material that enables long electron conduction in the active material layer has attracted attention.

Patent Literature 1 proposes an all-solid-state lithium secondary battery using a fibrous carbon material as a conductive aid, which enables long electron conduction in an active material layer even with a small amount of addition.

Patent Literature 2 proposes use of a combination of fibrous carbon and spherical carbon as a conductive aid in order to increase a contact area between an active material and the conductive aid. Patent Literature 2 describes a case where the content of the conductive aid including a combination of the fibrous carbon and the spherical carbon is specifically 5% by mass.

In a battery using a known electrolyte solution, in order to ensure lithium ion conduction between an active material and a liquid electrolyte, it is necessary to form a gap for the electrolyte solution to enter in the active material layer. On the other hand, in the case of the all-solid-state lithium secondary battery, since lithium ions move between the active material and the solid electrolyte, it is considered desirable that the active material layer does not have gaps (for example, paragraph 0039 of Patent Literature 3). The gap can be reduced by pressing an electrode at a high pressure. As a result, a volume energy density can be increased. In addition, by pressing the electrode at a high pressure, a contact area between the active material and the solid electrolyte can be increased, which also contributes to improvement of battery characteristics such as reduction of interface resistance (Patent Literature 2). That is, from the viewpoint of improving the volume energy density, it is considered that a porosity of the active material layer is preferably as close as possible to 0.

Patent Literature 3 discloses a bulk-type all-solid-state secondary battery in which specific plastic crystal and a lithium salt are contained in a gap of a negative electrode or a positive composite layer, and the porosity is 0.01% to 20% (paragraph 0039). However, as a specific example of the conductive aid, acetylene black is merely described.

CITATION LIST

Patent Literature

Patent Literature 1: JP 2010-262764 A
Patent Literature 2: JP 2016-9679 A
Patent Literature 3: WO 2016/157348 A

SUMMARY OF INVENTION

Technical Problem

When the electrode is pressed at a high pressure for the purpose of decreasing the porosity of the active material layer, the active material is likely to be broken. In addition, in the electrode pressed at a high pressure, a crack is generated in the active material layer due to a volume change due to expansion and contraction of the active material during charging and discharging, and ionic conductivity and electron conductivity are likely to decrease. As a result, battery performance may be deteriorated. An object of the present invention is to provide an active material layer of an all-solid-state lithium secondary battery (this active material layer is hereinafter also simply referred to as an "active material layer") in which deterioration in ionic conductivity and electron conductivity hardly occurs even when charging and discharging are repeated.

Solution to Problem

The present inventors have focused on a gap in an active material layer of an all-solid-state lithium secondary battery. As a result, the present inventors have found that when the active material layer has the gap, generation of a crack in the active material layer is suppressed even when charging and discharging accompanied by a volume change of an active material are repeated. In addition, the present inventors have found that by using predetermined fibrous carbon as a conductive aid, deterioration of electron conductivity is suppressed even when charging and discharging accompanied by the volume change of the active material are repeated. That is, the present inventors have found that when the active material layer has the gap, and the conductive aid containing fibrous carbon having a predetermined shape is blended in the active material layer, the active material layer in which the ionic conductivity and the electron conductivity are less likely to deteriorate even when charging and discharging are repeated is obtained, and have completed the present invention.

That is, the present invention is as follows.

[1] An active material layer for an all-solid-state lithium secondary battery including at least an active material, a conductive aid, and a solid electrolyte, in which
  the active material layer has a gap,
  a ratio of the conductive aid in the active material layer is 0.1% by mass or more and less than 5.0% by mass,
  the conductive aid contains fibrous carbon having an average fiber diameter of 10 to 900 nm, and a ratio of the fibrous carbon in the conductive aid is 20% by mass or more.

[2] The active material layer for an all-solid-state lithium secondary battery according to [1], in which a porosity of the active material layer is 5.0% by volume or more and 50% by volume or less.

The invention described in [1] or [2] above is the active material layer for an all-solid-state lithium secondary battery including fibrous carbon having a predetermined shape as a conductive aid and having the gap. The all-solid-state lithium secondary battery including the active material layer constituted by this combination exhibit excellent battery performance. Although the reason for this is not necessarily clear, it is considered to be because the specific fibrous carbon contributes to the formation and maintenance of the gap, and an influence of the volume change of the active material caused by charging and discharging are alleviated by the predetermined gap and the conductive aid having a predetermined shape.

[3] The active material layer for an all-solid-state lithium secondary battery according to [1] or [2], in which electrical conductivity in a film thickness direction of the active material layer is $1.0 \times 10^{-3}$ S/cm or more.

The invention described in [3] above is the active material layer in which the electrical conductivity in the film thickness direction is increased. The electrical conductivity in the film thickness direction is enhanced by orienting the fibrous carbon having a predetermined shape in the film thickness direction.

[4] The active material layer for an all-solid-state lithium secondary battery according to any one of [1] to [3], in which a volume ratio of the conductive aid in the active material layer is 0.5% by volume or more and 4.0% by volume or less.

In the invention described in [4] above, since the conductive aid contained in the active material layer contains fibrous carbon, the active material layer has high electron conductivity even when an amount of the conductive aid used is small.

[5] The active material layer for an all-solid-state lithium secondary battery according to any one of [1] to [4], in which the volume ratio of the fibrous carbon in the active material layer is 0.5% by volume or more and 4% by volume or less.

In the invention described in [5] above, since the active material layer contains a predetermined amount of fibrous carbon, the active material layer has particularly high electron conductivity even when the amount of the conduction aid used is small.

[6] The active material layer for an all-solid-state lithium secondary battery according to any one of [1] to [5], in which the conductive aid comprises the fibrous carbon and spherical particles.

In the invention described in [6] above, since the active material layer contains the fibrous carbon and the spherical particles, the fibrous carbon is hardly oriented in one direction in the active material layer. As a result, the fibrous carbon is easily oriented in the film thickness direction of the active material layer.

[7] The active material layer for an all-solid-state lithium secondary battery according to any one of [1] to [6], in which a crystallite spacing (d002) of the fibrous carbon measured by an X-ray diffraction method is 0.3400 nm or more.

In the invention described in [7] above, since the fibrous carbon contained in the active material layer is less likely to be broken, the electron conductivity is less likely to deteriorate even by the volume change of the active material caused by charging and discharging.

[8] The active material layer for an all-solid-state lithium secondary battery according to any one of [1] to [7], in which a coefficient of variation of an effective fiber length of the fibrous carbon is 35% or more and 90% or less.

In the invention described in [8] above, since the fibrous carbon having a long effective fiber length and the fibrous carbon having a short effective fiber length coexist in the active material layer, a long distance conductive path can be formed by the fibrous carbon having a long effective fiber length. Since the fibrous carbon having a short effective fiber length exists, orientation of the fibrous carbon having a long effective fiber length in an in-plane direction is suppressed.

[9] The active material layer for an all-solid-state lithium secondary battery according to any one of [1] to [8], in which a compression recovery degree of the fibrous carbon represented by the following Formula (1) is 50% or more and 90% or less:

$$\text{compression recovery degree (\%)} = \text{volume resistivity during recovery} / \text{volume resistivity during compression} \times 100 \qquad \text{Formula (1)}.$$

In the invention described in [9] above, since the fibrous carbon contained in the active material layer has an elastic force and is hardly broken, the electron conductivity is less likely to deteriorate even by the volume change of the active material caused by charging and discharging.

[10] The active material layer for an all-solid-state lithium secondary battery according to any one of [1] to [9], in which a specific surface area of the conductive aid is 1 m²/g or more and 50 m²/g or less.

In the invention described in [10], since the specific surface area of the conductive aid is in a predetermined range, a contact area with the active material and the conductive aid are sufficiently secured.

[11] The active material layer for an all-solid-state lithium secondary battery according to any one of [1] to [10], in which the active material and the conductive aid satisfy the following Formula (2):

$$\Sigma(Xe/Re)/\Sigma(Xa/Ra) < 9 \qquad \text{Formula (2)}$$

Xe: content (% by mass) of conductive aid contained in active material layer,

Re: average particle diameter (average fiber diameter) (μm) of conductive aid contained in active material layer, Ra: average particle diameter (μm) of active material contained in active material layer, Xa: content (% by mass) of active material contained in active material layer The invention described in [11] above defines a ratio of a total surface area of the conductive aid to a total surface area of the active material, and a surface of the active material is not completely covered with the conductive aid, so that a contact point between the solid electrolyte and the active material, which are responsible for ionic conduction, is sufficiently secured, and good ionic conductivity is secured.

[12] An all-solid-state lithium secondary battery including the active material layer according to any one of [1] to [11] and a solid electrolyte.

Advantageous Effects of Invention

Since the active material layer of the present invention has the gap and contains the conductive aid having a fiber shape, an ionic conductive path and an electron conductive path are maintained even if the volume change due to expansion and contraction of the active material during charging and discharging occurs. Thus, both the ionic conductivity and the electron conductivity can be achieved. This makes it possible to provide a high-power all-solid-state lithium secondary battery with reduced reaction resistance.

DESCRIPTION OF EMBODIMENTS

1. Active Material Layer for all-Solid-State Lithium Secondary Battery

The active material layer for an all-solid-state lithium secondary battery of the present invention may be either a positive electrode active material layer or a negative electrode active material layer of the all-solid-state lithium secondary battery. The active material layer includes at least an active material, a solid electrolyte, and a conductive aid. At least fibrous carbon is contained as the conductive aid.

The active material layer has a gap. The porosity is preferably 5.0% by volume or more and 50% by volume or less. When the porosity is within this range, occurrence of a crack in the active material layer is particularly suppressed even when a charge-discharge cycle accompanied by a volume change of the active material is repeated. By using such an active material layer having a gap, it is possible to constitute a high-power all-solid-state lithium secondary battery having high electron conductivity and ionic conductivity. The lower limit value of the porosity is preferably 7.0% by volume, preferably 9.0% by volume, preferably 10% by volume, more preferably 11% by volume, still more preferably 12% by volume, even more preferably 15% by volume, and particularly preferably 18% by volume. The upper limit value of the porosity is preferably 48% by volume, more preferably 45% by volume, still more preferably 42% by volume, even more preferably 37% by volume, and particularly preferably 30% by volume.

The porosity of the active material layer may be adjusted by controlling the average fiber diameter and average effective fiber length of the fibrous carbon described later, as well as the material, size, and content of the positive electrode or negative electrode active material to be used, and molding conditions of pressure molding performed as necessary when the active material layer is formed.

A method of calculating the porosity is not particularly limited, and examples thereof include a method of calculating the porosity from the true density and density of the active material layer based on the following Formula (3) and a method of calculating the porosity from a three-dimensional image obtained by tomography such as X-ray CT.

Porosity (% by volume)=(true density−density of active material layer)/true density×100   Formula (3)

In the case of calculation based on Formula (3), the true density and the apparent density of the active material layer are each measured. Examples of a method of measuring the true density include a calculation method using the true density and mass ratio of each material constituting the active material layer, and a method of measuring the true density using a gas phase substitution method (pycnometer method) or a liquid phase method (Archimedes method) after pulverizing the active material layer. The apparent density of the active material layer is calculated, for example, from the mass and volume of the active material layer by the following Formula (4).

Apparent density of active material layer=mass of active material layer/(film thickness of active material layer×area)   Formula (4)

Electrical conductivity of the active material layer in a film thickness direction is preferably $1.0\times10^{-3}$ S/cm or more, more preferably $5.0\times10^{-3}$ S/cm or more, still more preferably $1.0\times10^{-2}$ S/cm or more, and particularly preferably $1.6\times10^{-2}$ S/cm or more. Such electrical conductivity is achieved by containing predetermined fibrous carbon as a conductive aid.

(1) Positive Electrode Active Material Layer

The positive electrode active material layer of the present invention contains at least a positive electrode active material, a solid electrolyte, and a conduction aid, and may further contain a binder or the like.

As the positive electrode active material, a conventionally known material may be used. For example, a lithium-containing metal oxide capable of occluding and releasing lithium ions is suitable. Examples of the lithium-containing metal oxide include a complex oxide containing lithium and at least one element selected from the group consisting of Co, Mg, Mn, Ni, Fe, Al, Mo, V, W, Ti, and the like.

Specific examples thereof include at least one selected from the group consisting of $Li_xCoO_2$, $Li_xNiO_2$, $Li_xMnO_2$, $Li_xCo_aNi_{1-a}O_2$, $Li_xCo_bV_{1-b}O_x$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$, $Li_xNi_aMn_dCo_{1-a-d}O_2$, $Li_xNi_aCo_dAl_{1-a-d}O_2$ (here, x=0.02 to 1.2, a=0.1 to 0.9, b=0.8 to 0.98, c=1.2 to 1.96, d=0.1 to 0.9, and z=2.01 to 2.3), and the like. Preferable examples of the lithium-containing metal oxide include at least one selected from the group consisting of $Li_xCoO_2$, $Li_xNiO_2$, $Li_xMnO_2$, $Li_xCo_aNi_{1-a}O_2$, $Li_xMn_2O_4$, $Li_xMn_cCo_{2-c}O_4$, $Li_xMn_cNi_{2-c}O_4$, $Li_xCO_bV_{1-b}O_z$, $Li_xNi_aMn_dCo_{1-a-d}O_2$, and $Li_xNi_aCo_dAl_{1-a-d}O_2$ (here, x, a, b, c, d, and z are the same as described above). The positive electrode active materials may be used singly or in combination of two or more kinds thereof. The value of x is a value before the start of charging and discharging, and varies depending on charging and discharging.

A surface of the positive electrode active material may be coated with a coating layer. The coating layer suppress a reaction between the positive electrode active material and the solid electrolyte (particularly, sulfide solid electrolyte). Examples of the coating layer include Li-containing oxides such as $LiNbO_3$, $Li_3PO_4$, and LiPON. An average thickness of the coating layer is, for example, 1 nm or more. On the other hand, the average thickness of the coating layer is, for example, 20 nm or less, and may be 10 nm or less.

An average particle diameter of the positive electrode active material is preferably 20 μm or less, more preferably 0.05 to 15 μm, and still more preferably 1 to 12 μm. If the average particle diameter exceeds 20 μm, efficiency of a charge-discharge reaction under a large current may be reduced.

The content of the positive electrode active material in the positive electrode active material layer is not particularly limited, and is preferably 30 to 99% by mass, more preferably 40 to 95% by mass, and still more preferably 50 to 90% by mass. When the content is less than 30% by mass, use in power supply applications requiring a high energy density may be difficult. When the content exceeds 99% by mass, the content of substances other than the positive electrode active material is reduced, and performance as the positive electrode active material layer may be deteriorated.

The content of the solid electrolyte in the positive electrode active material layer is not particularly limited, and is preferably 5 to 60% by mass, more preferably 10 to 50% by mass, and still more preferably 20 to 40% by mass. When the content is less than 5% by mass, ionic conductivity of the positive electrode active material layer may be insufficient. When the content exceeds 60% by mass, the content of the positive electrode active material is reduced, use in power supply applications requiring a high energy density may be difficult.

The positive electrode active material layer may contain a small amount of a binder as long as the electron conductivity and the ionic conductivity are not inhibited.

A thickness of the positive electrode active material layer is usually 10 to 1000 μm.

(2) Negative Electrode Active Material Layer

The negative electrode active material layer constituting the all-solid-state lithium secondary battery of the present invention contains at least a negative electrode active material, and may contain a solid electrolyte, a conductive aid, a binder, and the like.

As the negative electrode active material, a conventionally known material may be selected and used. For example, any one of Li metal, a carbon material, lithium titanate ($Li_4Ti_5O_{12}$), Si, Sn, In, Ag, and Al, or an alloy or oxide containing at least one of these may be used. Among these, the Li metal is preferable from the viewpoint of increasing the energy density.

As the negative electrode active material other than Li metal, a carbon material is widely used. Examples of the carbon material include natural graphite, artificial graphite manufactured by heat-treating natural petroleum-based coke or coal-based coke, hard carbon obtained by carbonizing a resin, and mesophase pitch-based carbon materials.

As the carbon material selected as the negative electrode active material of an all-solid-state battery, hard carbon is preferable from the viewpoint that a layer interval of crystals is wide and expansion and shrinkage during charging and discharging is relatively not large. The hard carbon has a structure in which fine crystalline graphene layers are arranged without regularity, and lithium ions are occluded by lithium ion insertion into the graphene layer and lithium aggregation (lithium metallization) into a space formed between the graphene layers.

When natural graphite or artificial graphite is used, from the viewpoint of increasing a battery capacity, graphite in which spacing d (002) of a (002) plane of a graphite structure by powder X-ray diffraction is in a range of 0.335 to 0.337 nm is preferable. The natural graphite refers to graphitic materials that are naturally produced as an ore. The natural graphite is classified into two types according to an appearance and properties thereof. One type of natural graphite is scaly graphite having a high crystallinity degree, and the other type of natural graphite is earthy graphite having a low crystallinity degree. The scaly graphite is further classified into scale like graphite having a leaf-like appearance and massive scaly graphite. In the natural graphite serving as the graphitic material, the locality, the properties, and the type are not particularly limited. In addition, natural graphite, or particles manufactured with natural graphite as a raw material may be heat-treated, and used.

The artificial graphite refers to graphitic materials close to graphite and perfect crystals of graphite which are artificially prepared by a wide range of techniques. Typical examples thereof include those obtained through a firing step at about 500 to 1000° C. and a graphitizing step at 2000° C. or higher using tar or coke obtained from residues by dry distillation of coal, distillation of crude oil, or the like as a raw material. In addition, quiche graphite obtained by reprecipitating carbon from dissolved iron is one type of artificial graphite.

Using alloy containing at least one of Si and Sn other than a carbon material as a negative electrode active material is advantageous in that the capacitance is reduced compared to the case of using each of Si and Sn singly and the case of using an oxide of each of Si and Sn. Among these, Si-based alloy is preferable. Examples of the Si-based alloy include alloys of Si and at least one element selected from the group consisting of B, Mg, Ca, Ti, Fe, Co, Mo, Cr, V, W, Ni, Mn, Zn, Cu and the like. Specific examples thereof include at least one selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, and the like.

In the active material layer for an all-solid-state lithium secondary battery of the present invention, as the negative electrode active material, the above-described materials may be used singly or in combination of two or more kinds thereof.

The content of the negative electrode active material in the negative electrode active material layer is not particularly limited, and is preferably 30 to 100% by mass, more preferably 40 to 99% by mass, and still more preferably 50 to 95% by mass. When the content is less than 30% by mass, use in power supply applications requiring a high energy density may be difficult.

The content of the solid electrolyte in the negative electrode active material layer is not particularly limited, and is preferably 0 to 60% by mass, more preferably 5 to 50% by mass, and still more preferably 10 to 40% by mass. When the content exceeds 60% by mass, the content of the positive electrode active material is reduced, use in power supply applications requiring a high energy density may be difficult.

The negative electrode active material layer may contain a small amount of a binder as long as the electron conductivity and the ionic conductivity are not inhibited.

A thickness of the negative electrode active material layer is usually 1 to 1000 μm.

(3) Solid Electrolyte

As the solid electrolyte used in the present invention, a conventionally known material may be selected and used. Examples thereof include sulfide-based solid electrolytes, oxide-based solid electrolytes, hydride-based solid electrolytes, and polymer electrolytes. In the present invention, it is preferable to use a sulfide-based solid electrolyte because lithium ion conductivity is high.

Specific examples of the sulfide-based solid electrolyte include sulfide-based solid electrolytes (Li-A-S) including Li, A, and S. A in the sulfide-based solid electrolyte Li-A-S is at least one species selected from the group consisting of P, Ge, B, Si, Sb, and I. Specific examples of such sulfide-based solid electrolyte Li-A-S include $Li_7P_3S_{11}$, $70Li_2S$-$30P_2S_5$, $LiGe_{0.25}P_{0.75}S_4$, $75Li_2S$-$25P_2S_5$, $80Li_2S$-$20P_2S_5$, $Li_{10}GeP_2S_{12}$, $Li_{9.54}Si_{1.74}P_{1.44}S_{11.7}Cl_{0.3}$, $Li_2S$—$SiS_2$, and $Li_6PS_5Cl$, and $Li_7P_3S_{11}$ is particularly preferable because it has a high ionic conductivity.

Specific examples of the hydride-based solid electrolyte include complex hydrides of lithium borohydride. Examples of the complex hydrides include $LiBH_4$—$LiI$-based complex hydride, $LiBH_4$—$LiNH_2$-based complex hydride, $LiBH_4$—$P_2S_5$, and $LiBH_4$—$P_2I_4$.

The solid electrolyte may be used alone, or two or more kinds thereof may be used in combination as necessary.

(4) Conductive Aid

The conductive aid contained in the active material layer of the present invention contains fibrous carbon described later. The conductive aid may contain a carbon-based conductive aid other than a fiber form in addition to the fibrous carbon.

A ratio of the conductive aid contained in the active material layer is 0.1% by mass or more and less than 5% by mass. The lower limit of the ratio of the conductive aid is preferably 0.5% by mass or more, more preferably 1.0% by mass or more, still more preferably 1.2% by mass or more, and particularly preferably 1.5% by mass or more. The upper limit of the ratio of the conductive aid is preferably 4.5% by mass or less, more preferably 4.0% by mass or less, still more preferably 3.5% by mass or less, even more preferably 3.0% by mass or less, and particularly preferably 2.5% by mass or less. When the ratio of the conductive aid is within the above range, a balance between the electron conductivity and lithium ionic conductivity is good, a rate characteristic value can be high, and a reaction resistance value can be low. Since an amount of the conductive aid in the active material layer is small, an amount of the active material can be increased.

The conductive aid contains at least fibrous carbon. The ratio of the fibrous carbon in the conductive aid is preferably 20% by mass or more, more preferably 40% by mass or more, still more preferably 50% by mass or more, even more preferably 60% by mass or more, further more preferably 70% by mass or more, still further more preferably 80% by mass or more, even further more preferably 85% by mass or more, and particularly preferably 90% by mass or more from the viewpoint of enhancing the electron conductivity of the active material layer. The ratio may be 100% by mass. Furthermore, the ratio is preferably 99% by mass or less.

A specific surface area of the conductive aid is preferably 1 $m^2/g$ or more and 50 $m^2/g$ or less. When the specific surface area of the conductive aid is less than 1 $m^2/g$, it is difficult to secure a contact point between the active material and the conductive aid, and an electron conductive path may not be sufficiently formed.

On the other hand, when the specific surface area is too large, an ionic conductive path may be hindered. That is, when the specific surface area of the conductive aid exceeds 50 $m^2/g$, the conductive aid covers the surface of the active material, so that a contact point between the solid electrolyte and the active material, which are responsible for ionic conduction, decreases, and ionic conduction may be inhibited. The lower limit of the specific surface area is preferably 2 $m^2/g$ or more, more preferably 3 $m^2/g$ or more, still more preferably 5 $m^2/g$ or more, and particularly preferably 7 $m^2/g$ or more. The upper limit of the specific surface area is preferably 40 $m^2/g$ or less, more preferably 30 $m^2/g$ or less, still more preferably 25 $m^2/g$ or less, and particularly preferably 20 $m^2/g$ or less.

The active material and the conductive aid contained in the active material layer preferably satisfy the following Formula (2).

$$\Sigma(Xe/Re)/\Sigma(Xa/Ra)<9 \qquad \text{Formula (2)}$$

Xe: content (% by mass) of conductive aid contained in active material layer,

Re: average particle diameter (average fiber diameter) (μm) of conductive aid contained in active material layer, Ra: average particle diameter (μm) of active material contained in active material layer, Xa: content (% by mass) of active material contained in active material layer Since the average particle diameter (fiber diameter) of the conductive aid is inversely proportional to the specific surface area of the conductive aid, Xe/Re is proportional to a total surface area of the conductive aid. When the conductive aid contains both fibrous carbon and spherical carbon, $\Sigma(Xe/Re)$ obtained by calculating and adding the values of Xe/Re of each carbon is proportional to the specific surface area of the conductive aid. Similarly, since the average particle diameter of the active material: R is inversely proportional to the specific surface area of the active material, $\Sigma(Xa/Ra)$ is proportional to a total surface area of the active material. Therefore, the left side of Formula (2) is proportional to (total surface area of conductive aid)/(total surface area of active material).

The right side of Formula (2) is preferably 8, preferably 7, preferably 6, preferably 5, preferably 4, preferably 3, and particularly preferably 2.5. When $\Sigma(Xe/Re)/\Sigma(Xa/Ra)$ is 9 or more, the total surface area of the conductive aid is excessive with respect to the total surface area of the active material, so that the contact point between the solid electrolyte and the active material, which are responsible for ionic conduction, decreases, and ionic conduction may be inhibited.

The contents of the active material and the conductive aid contained in the active material layer, the specific surface area of the conductive aid, and the average particle diameter of the active material preferably satisfy the following Formula (3).

$$\Sigma(\sigma\times Xe)/\Sigma(Xa/Ra)<20 \qquad \text{Formula (3)}$$

σ: specific surface area ($m^2/g$) of conductive aid contained in active material layer, Xe: content (% by mass) of conductive aid contained in active material layer, Ra: average particle diameter (μm) of active material contained in active material layer, Xa: content (% by mass) of active material contained in active material layer Since the average particle diameter of the active material: Ra is inversely proportional to the specific surface area of the active material, $\Sigma(Xa/Ra)$ is proportional to the total surface area of the active material. On the other hand, $\Sigma(\sigma\times Xe)$ is proportional to the total surface area of the conductive aid. Therefore, the left side of Formula (3) is proportional to (total surface area of conductive aid)/(total surface area of active material).

The right side of Formula (3) is preferably 15, more preferably 13, more preferably 12, more preferably 10, more preferably 8, more preferably 6, more preferably 5, and particularly preferably 4. When $\Sigma(\sigma\times Xe)/\Sigma(Xa/Ra)$ is 20 or more, the total surface area of the conductive aid is excessive with respect to the total surface area of the active material, so that the contact point between the solid electrolyte and the active material, which are responsible for ionic conduction, decreases, and ionic conduction may be inhibited.

The ratio of the fibrous carbon contained in the active material layer is preferably 0.1% by mass or more and 4.0% by mass or less. The lower limit of the ratio of the fibrous carbon is more preferably 0.5% by mass or more, still more preferably 1.0% by mass or more, even more preferably 1.2% by mass or more, further more preferably 1.5% by mass or more, and particularly preferably 1.8% by mass or more. The upper limit of the ratio of the fibrous carbon is more preferably 3.5% by mass or less, still more preferably 3.0% by mass or less, even more preferably 2.5% by mass or less, and particularly preferably 2.3% by mass or less.

In the active material layer of the present invention, a volume ratio of the conductive aid is important in consideration of formation of a conductive path in the active material layer. The active material layer has a gap. Thus, the numerical values of the volume ratio of the conductive aid in the active material layer are all apparent volume ratios in consideration of the gap of the active material layer. The volume ratio of the conductive aid in the active material layer is preferably 0.5% by volume or more and 4.0% by volume or less. The lower limit of the volume ratio of the conductive aid is more preferably 1.0% by volume or more, still more preferably 1.2% by volume or more, and particularly preferably 1.5% by volume or more. The upper limit of the volume ratio of the conductive aid is more preferably 3.5% by volume or less, still more preferably 3.0% by volume or less, even more preferably 2.5% by volume or less, further more preferably 2.2% by volume or less, and particularly preferably 2.0% by volume or less.

When the volume ratio of the conductive aid is less than 0.5% by volume, the conductivity of the active material layer becomes insufficient, and the battery performance may not be sufficiently improved.

When the volume ratio of the conductive aid exceeds 4.0% by volume, the conductive aid is excessive, so that the active material is covered with the conductive aid, and it becomes difficult to secure a contact point between the active material and the solid electrolyte. As a result, the conductivity of lithium ions is lowered, and the battery performance may not be sufficiently improved. As a result of increasing a blending amount of the conductive aid, the amount of the active material in the active material layer relatively decreases.

The volume ratio of the fibrous carbon in the active material layer is preferably 0.5% by volume or more and 4.0% by volume or less. The active material layer has a gap. Thus, the numerical values of the volume ratio of the fibrous carbon in the active material layer are all apparent volume ratios in consideration of the gap of the active material layer. The lower limit of the volume ratio of the fibrous carbon is more preferably 1.0% by volume or more, still more preferably 1.2% by volume or more, and particularly preferably 1.5% by volume or more. The upper limit of the volume ratio of the fibrous carbon is more preferably 3.5% by volume or less, still more preferably 3.0% by volume or less, even more preferably 2.5% by volume or less, further more preferably 2.2% by volume or less, and particularly preferably 2.0% by volume or less. When the volume ratio of the fibrous carbon is less than 0.5% by volume, the conductivity of the active material layer becomes insufficient, and the battery performance may not be sufficiently improved. When the volume ratio of the fibrous carbon exceeds 4.0% by volume, the blending amount of the fibrous carbon increases, and as a result, the amount of the active material in the active material layer relatively decreases. Since the fibrous carbon is excessive, the active material is covered with the fibrous carbon, and it may be difficult to secure the contact point between the active material and the solid electrolyte. As a result, the conductivity of lithium ions is lowered, and the battery performance may not be sufficiently improved.

(4-1) Fibrous Carbon

The fibrous carbon contained in the active material layer of the present invention is not particularly limited as long as the effect of the present invention is exerted, and representative examples thereof include artificial graphites produced by heat treatment of natural graphite, and petroleum- and coal-based coke, hardly graphitizable carbon, easily graphitizable carbon, carbon fibers, carbon nanotubes (CNT), and vapor grown carbon fibers (VGCF (registered trademark)).

In the fibrous carbon of the present invention, a distance (d002) between adjacent graphite sheets as measured by wide angle X-ray measurement is preferably 0.3400 nm or more, more preferably 0.3410 nm or more, and still more preferably 0.3420 nm or more. d002 is preferably 0.3450 nm or less, and more preferably 0.3445 nm or less. When d002 is 0.3400 nm or more, the fibrous carbon is less likely to be brittle. For this reason, the fiber is hardly broken during crushing or processing such as preparation of kneaded slurry, and the fiber length is maintained. As a result, a conductive path having a long distance is easily formed. The conductive path is easily maintained following the volume change of the active material accompanying charging and discharging of the all-solid-state lithium secondary battery.

In the fibrous carbon of the present invention, a crystallite size (Lc002) as measured by wide angle X-ray measurement is preferably 50 nm or less, and more preferably 30 nm or less. The larger the crystallite size (Lc002), the higher the crystallinity and the better the conductivity. However, when the crystallite size (Lc002) is small, the fibrous carbon is less likely to be brittle. For this reason, the fiber is hardly broken during crushing or processing such as preparation of kneaded slurry, and the fiber length is maintained. As a result, a conductive path having a long distance is easily formed. The conductive path is easily maintained following the volume change of the active material accompanying charging and discharging of the all-solid-state lithium secondary battery.

In the present invention, the crystallite size (Lc002) refers to a value measured according to "Measurement of Lattice Parameters and Crystallite Sizes of Carbon Materials" defined in Japan Industrial Standard JIS R7651 (2007 edition).

The average fiber diameter of the fibrous carbon used in the present invention is preferably 10 nm or more and 900 nm or less. The upper limit is preferably 600 nm or less, more preferably 500 nm or less, still more preferably 400 nm or less, and still more preferably 300 nm or less. The lower limit is preferably 50 nm or more, more preferably 100 nm or more, still more preferably 150 nm or more, even more preferably 200 nm or more, and particularly preferably more than 200 nm.

The fibrous carbon having an average fiber diameter of less than 10 nm has a very low bulk density and is poor in handleability. When the active material layer is formed, strength of the active material layer tends to decrease. The fibrous carbon having an average fiber diameter of less than 10 nm has a large specific surface area, and covers the surface of the active material in the active material layer. As a result, the number of contact points between the solid electrolyte and the active material decreases, leading to inhibition of formation of the ionic conductive path. In the fibrous carbon having an average fiber diameter exceeding 900 nm, a space tends to be formed between fibers in the active material layer, and it may be difficult to increase the active material layer density.

The specific surface area of the fibrous carbon is preferably 1 $m^2/g$ or more and 50 $m^2/g$ or less. The upper limit is preferably 40 $m^2/g$ or less, more preferably 30 $m^2/g$ or less, still more preferably 25 $m^2/g$ or less, and particularly preferably 20 $m^2/g$ or less. The lower limit is preferably 1 $m^2/g$ or more, more preferably 2 $m^2/g$ or more, still more preferably 3 $m^2/g$ or more, even more preferably 5 $m^2/g$ or more, and particularly preferably 7 $m^2/g$ or more.

The fibrous carbon used in the present invention has high conductivity in a low packing density state. In the fibrous carbon having high conductivity in the low packing density state, the conductivity can be imparted at a lower addition concentration.

Specifically, a powder volume resistivity at the time of filling at a packing density of 0.8 $g/cm^3$ is preferably $4.00 \times 10^{-2}$ $\Omega \cdot cm$ or less, and more preferably $3.00 \times 10^{-2}$ $\Omega \cdot cm$ or less. If the powder volume resistivity exceeds $4.00 \times 10^{-2}$ $\Omega \cdot cm$, an amount of the fibrous carbon added required for improving the conductivity increases, which is not preferable. The lower limit is not particularly limited, and is generally about 0.0001 $\Omega \cdot cm$.

The powder volume resistivity at the time of filling at a packing density of 0.5 $g/cm^3$ is preferably 0.10 $\Omega \cdot cm$ or less, and more preferably 0.08 Ω·cm or less. If the powder volume resistivity exceeds 0.10 Ω·cm, the amount of the fibrous carbon added required for improving the conductivity increases, which is not preferable. The lower limit is not particularly limited, and is generally about 0.0001 Ω·cm.

The average effective fiber length of the fibrous carbon used in the present invention is preferably 10 μm or more, more preferably 20 μm or more, still more preferably 30 μm or more, even more preferably 40 μm or more, and particularly preferably 50 μm or more. The average effective fiber length is preferably 200 μm or less, more preferably 150 μm or less, and still more preferably 120 μm or less. When the active material layer is produced using the fibrous carbon having an average effective fiber length of less than 10 μm, the formation of the conductive path tends to be insufficient in the active material layer, and a resistance value in the film thickness direction of the active material layer may not be sufficiently reduced. When the active material layer is produced using the fibrous carbon having an average effective fiber length exceeding 200 μm, the fibrous carbon is easily oriented in an in-plane direction in the active material layer. As a result, it may be difficult to form the conductive path in the film thickness direction.

In the present invention, the effective fiber length of the fibrous carbon is defined as a length of the longest line segment, the both ends of which are in contact with a single fibrous carbon. In other words, the effective fiber length is the maximum linear distance over which a single fibrous carbon can be made electrically conductive. That is, when the fibrous carbon has a complete linear structure, the effective length is substantially equal to the fiber length. When the fibrous carbon has a branched structure or is rounded, the effective fiber length refers to the length of the largest line segment connecting two points on the single fibrous carbon.

A coefficient of variation (CV value) of the effective fiber length in the fibrous carbon used in the present invention is preferably 20% or more, more preferably 30% or more, still more preferably 35% or more, and particularly preferably 40% or more. Furthermore, the coefficient of variation (CV value) of the effective fiber length in the fibrous carbon used in the present invention is preferably 90% or less, and more preferably 85% or less. When the coefficient of variation of the effective fiber length is 20% or more and 90% or less, the fibrous carbon having a long effective fiber length and the fibrous carbon having a short effective fiber length coexist. Thus, a long distance conductive path can be efficiently formed in the active material layer by the fibrous carbon having a long effective fiber length, and a contact point with the active material can be secured by the fibrous carbon having a short effective fiber length. A method of forming the active material layer is not particularly limited, and for example, when a method is adopted in which each substance constituting the active material layer is dispersed in a liquid to be applied and dried, an action of inhibiting the orientation of the fibrous carbon having a long effective fiber length in the in-plane direction by the fibrous carbon having a short effective fiber length can be enhanced, and the conductive path in the film thickness direction can be efficiently formed.

In the fibrous carbon used in the present invention, the average effective fiber length (A) and the average fiber length (B) preferably satisfy the following Formula (1):

$$0.500 < A/B < 0.900 \quad \text{Formula (1)}$$

The lower limit of A/B is more preferably 0.550, still more preferably 0.600, and particularly preferably 0.650. The upper limit of A/B is more preferably 0.850, still more preferably 0.800, and particularly preferably 0.750.

In the fibrous carbon used in the present invention, the average effective fiber length (A) is smaller than the average fiber length (B). That is, most of the fibrous carbon does not have a perfect linear shape but has a slightly bent shape. In the fibrous carbon having such a shape, the orientation of the fibrous carbon in the in-plane direction is suppressed in the active material layer. That is, since the fibrous carbons are in contact with each other and have a bent shape, the fibrous carbons are randomly dispersed without being oriented in a certain direction. Thus, a sufficient amount of fibrous carbon is also oriented in the thickness direction of the active material layer. As a result, a large number of long-distance conductive paths can be formed in the thickness direction of the active material layer.

The fibrous carbon having such a shape may be produced by passing through a resin composite fiber produced under predetermined conditions and firing at a predetermined temperature in a process for producing the fibrous carbon.

An average aspect ratio of the present fibrous carbon, that is, a ratio (L/D) of an average effective fiber length (L) to an average fiber diameter (D) is preferably 80 or more, more preferably 100 or more, and particularly preferably 200 or more. By setting the average aspect ratio to 80 or more, when the active material layer is produced using the present fibrous carbon, the conductive path by the fibrous carbon is efficiently formed in the active material layer. As a result, cycle characteristics of the battery manufactured including this active material layer can be improved. By setting the average aspect ratio to 80 or more, mechanical strength of a composite layer can be increased, and even if the active material expands and contracts during charging and discharging and stress is applied to the active material layer, the occurrence of a crack in the active material layer can be prevented.

If the average aspect ratio is less than 80, when the active material layer is produced using the fibrous carbon, the formation of the conductive path by the fibrous carbon tends to be insufficient in the active material layer, and the resistance value in the film thickness direction of the active material layer may not be sufficiently reduced. Since the mechanical strength of the active material layer is insufficient, when stress is applied to the composite layer at the time of the volume change of the active material accompanying charging and discharging, a crack is likely to occur in the active material layer. The upper limit of the average aspect ratio is 10,000, preferably 1000 or less, and more preferably 800 or less. When the aspect exceeds 10,000, the fibrous carbons may be entangled with each other to form an aggregate, the electron conductive path in the active material layer is biased, and a non-uniform charge-discharge reaction occurs, so that the performance of the all-solid-state battery may not be sufficiently exhibited, or the all-solid-state battery may be deteriorated.

In the fibrous carbon used in the present invention, a compression recovery degree represented by the following Formula (1) is preferably 50% or more and 90% or less.

Compression recovery degree (%)=volume resistivity during recovery/volume resistivity during compression×100      Formula (1)

Specifically, the compression recovery degree (%) refers to a ratio (%) of an amount of change in volume resistivity when the pressure is reduced from 1.0 MPa to 0.1 MPa to the amount of change in volume resistivity when pressure from 0.1 MPa to 1.0 MPa is applied to the fibrous carbon.

When the compression recovery degree is within this range, the fibrous carbon flexibly follows the volume expansion and contraction of the active material due to repetition of the charge-discharge cycle to maintain the gap and is hardly broken. Thus, the conductive path formed in the active material layer is sufficiently maintained. Due to an excellent elastic force of the fibrous carbon, the mechanical strength of the active material layer can be increased, and the ionic conductive path formed by the solid electrolyte is sufficiently maintained. As a result, it is possible to provide an all-solid-state lithium secondary battery having high cycle characteristics.

The lower limit of the compression recovery rate is more preferably 53%, still more preferably 56%, and particularly preferably 58%.

The upper limit of the compression recovery rate is more preferably 87%, still more preferably 84%, and particularly preferably 78%.

The fibrous carbon used in the present invention preferably has substantially no branching. Here, substantially no branching means that a degree of branching is 0.01 pieces/μm or less. Branching refers to a granular part in which the fibrous carbon is combined with other fibrous carbon at a location other than the end part, and means that the main axis of the fibrous carbon is branched midway, and that the main axis of the fibrous carbon has a branched secondary axis. As the branched fibrous carbon, for example, there is known a vapor grown (vapor phase method) carbon fiber (for example, VGCF (registered trademark) manufactured by Showadenko Co. Ltd.) produced by a vapor phase method of vaporizing a hydrocarbon such as benzene in a high temperature atmosphere in the presence of a metal such as iron as a catalyst. Since the fibrous carbon in the present invention has a substantially linear structure, the fibrous carbon has better dispersibility than that of the branched fibrous carbon, and easily forms a long-distance conductive path.

Here, the degree of branching of the fibrous carbon used in the present invention means a value measured using a photographic picture taken at a magnification of 5,000 by a field emission-type scanning electron microscope.

The fibrous carbon may have a fibrous form as a whole, which includes, for example, fibers with aspect ratios lower than the above-mentioned preferred range in contact with each other or bonded together to have a fiber shape in an integrated form (for example, continuous spherical carbon in a beaded shape, at least one or more extremely short fibers connected by fusion bonding or the like).

The fibrous carbon of the present invention preferably does not substantially contain a metal element. Specifically, a content ratio of metal elements is preferably 50 ppm or less, more preferably 30 ppm or less, and still more preferably 20 ppm or less in total. When the content ratio of the metal element exceeds 50 ppm, the battery tends to be deteriorated by a catalytic action of metal. In the present invention, the content ratio of the metal element means a total content ratio of Li, Na, Ti, Mn, Fe, Ni, and Co. In particular, the content ratio of Fe is preferably 5 ppm or less, more preferably 3 ppm or less, and still more preferably 1 ppm or less. When the content ratio of Fe exceeds 5 ppm, the battery is particularly made more likely to be deteriorated, which is not preferable.

In the fibrous carbon used in the present invention, hydrogen, nitrogen, and ash in the fibers are all preferably 0.5% by mass or less, and more preferably 0.3% by mass or less. When hydrogen, nitrogen, and ash in the fibrous carbon are all 0.5% by mass or less, the graphite layer is further kept from having structural defects, thereby making it possible to inhibit side reactions in the battery, which is preferable.

Among the fibrous carbons of the present invention, the fibrous carbons other than carbon nanotubes (CNT) and vapor grown carbon fibers (VGCF (registered trademark)) are particularly excellent in dispersibility in the active material layer. Although the reason is not clear, it is considered that the fibrous carbon has the above-described structure, that artificial graphite produced by heat treatment of natural graphite, and petroleum- and coal-based coke, hardly graphitizable carbon, easily graphitizable carbon, and the like are used as raw materials, that the fibrous carbon passes through a resin composite fiber in the production process, and the like. Since the fibrous carbon is excellent in dispersibility in the active material layer without containing spherical particles, it is considered that a long-distance conductive path can be formed and excellent battery performance is exhibited with a small content.

Although the fibrous carbon of the present invention may have a porous or hollow structure, it is preferable that the fibrous carbon passes through the resin composite fiber obtained by melt blend spinning in the process for producing the fibrous carbon. Thus, it is preferable that the fibrous carbon of the present invention is substantially solid, has a basically smooth surface, and has a linear structure without branching as described above.

In the fibrous carbon used in the present invention, its surface may be modified and reformed chemically or physically. A modulator and a form of modification are not particularly limited, and suitable ones are appropriately selected according to the purpose of modification.

The present inventors consider that the fibrous carbon used in the present invention contributes to the formation of the conductive path in the thickness direction in the active material layer, and has a function as a reinforcing filler that increases the mechanical strength of the active material layer, and a function of forming a gap (space) at a specific porosity in the active material layer and maintaining the gap. That is, by using the fibrous carbon, the mechanical strength of the active material layer is improved, a predetermined gap is formed in the active material layer, and the gap is maintained so as not to disappear, whereby a cushioning property contributed by the gap and the cushioning property based on the flexibility and elasticity of the fibrous carbon are exhibited. As a result, it is presumed that even when the volume change due to expansion and contraction of the active material during charging and discharging occurs, the electron conductivity and the ionic conductivity are maintained high, and the performance for all-solid-state lithium secondary batteries is improved.

The fibrous carbon used in the present invention may be produced, for example, by the following method.

First, a mesophase pitch composition in which a mesophase pitch is dispersed in a thermoplastic resin is prepared. Next, the mesophase pitch composition is molded into a thread shape or a film shape in a molten state. In particular, spinning is preferable. By spinning, the mesophase pitch dispersed in the thermoplastic resin is extended in the thermoplastic resin, and the mesophase pitch composition is formed into fibers to obtain a resin composite fiber. The resin composite fiber has a sea-island structure containing a thermoplastic resin as a sea component and the mesophase pitch as an island component.

Next, a gas containing oxygen is brought into contact with the obtained resin composite fiber to stabilize the mesophase pitch, thereby obtaining a resin composite stabilized fiber. The resin composite stabilized fiber has a sea-island structure containing a thermoplastic resin as a sea component and a stabilized mesophase pitch as an island component.

Subsequently, the thermoplastic resin as the sea component of the resin composite stabilized fiber is removed and separated to obtain a fibrous carbon precursor.

Further, the fibrous carbon precursor is heated at a high temperature to obtain ultrafine carbon fibers as the fibrous carbon.

That is, the fibrous carbon used in the present invention may be produced through the following steps:

(1) a molding step of molding a mesophase pitch composition, including a thermoplastic resin and a mesophase pitch, in the molten state to form the mesophase pitch into fibers to obtain a resin composite fiber;

(2) a stabilization step of bringing a gas containing oxygen into contact with the resin composite fiber to stabilize the mesophase pitch, thereby obtaining a resin composite stabilized fiber;

(3) a removing step of removing the thermoplastic resin from the resin composite stabilized fiber to obtain a fibrous carbon precursor; and (4) a high-temperature heating step of heating the fibrous carbon precursor at a high temperature to obtain fibrous carbon.

Next, each step will be described.

<Molding Step>

In the molding step, the mesophase pitch composition including the thermoplastic resin and preferably 1 to 150 parts by mass of the mesophase pitch with respect to 100 parts by mass of the thermoplastic resin is molded in the molten state to form the mesophase pitch into fibers to obtain the resin composite fiber.

In order to produce an ultrafine carbon fiber having an average fiber diameter of 10 to 900 nm, a dispersion diameter of the mesophase pitch in the thermoplastic resin is preferably 0.01 to 50 µm. When the dispersion diameter of the mesophase pitch in the thermoplastic resin deviates from the range of 0.01 to 50 µm, it may be difficult to produce desired fibrous carbon. In the mesophase pitch composition, the mesophase pitch forms a spherical or elliptical island component; however, the dispersion diameter in the present invention means the diameter when the island component is spherical, and means the major axis diameter when the island component is elliptical.

The mesophase pitch composition may be produced by kneading the thermoplastic resin and the mesophase pitch, for example, in the molten state at a temperature of 100 to 400° C. The thermoplastic resin and the mesophase pitch may be melt-kneaded using a known apparatus. For example, at least one selected from the group consisting of a single-screw kneader, a twin-screw kneader, a mixing roll and a Banbury mixer may be used.

<Mesophase Pitch>

The mesophase pitch is a pitch capable of forming an optically anisotropic phase (liquid crystal phase) in the molten state. Examples of the mesophase pitch used in the present invention include those obtained using a distillation residue of coal or petroleum as a raw material, and those obtained using an aromatic hydrocarbon such as naphthalene as a raw material. For example, a mesophase pitch derived from coal is obtained by a treatment mainly including hydrogenation/heat treatment of coal tar pitch; or a treatment mainly including hydrogenation/heat treatment/solvent extraction.

The optical anisotropy content (mesophase ratio) of the mesophase pitch is preferably 80% or more, and more preferably 90% or more.

In addition, a softening point of the mesophase pitch is preferably 100 to 400° C., and more preferably 150 to 350° C.

<Thermoplastic Resin>

The thermoplastic resin is required to be able to maintain its form in the stabilization step and to be easily removed in the step of obtaining a fibrous carbon precursor mixture described later. As such a thermoplastic resin, polyolefins, polyacrylate-based polymers such as polymethacrylate and polymethyl methacrylate, polystyrene, polycarbonate, polyarylate, polyester, polyamide, polyester carbonate, polysulfone, polyimide, polyetherimide, polyketone, polylactic acid, and the like are preferably used. Among them, polyolefins such as polyethylene, polypropylene, poly-4-methylpentene-1, and copolymers containing these are preferably used.

The thermoplastic resin used in the present invention has a glass transition temperature of preferably 250° C. or lower when being amorphous, and a melting point of preferably 300° C. or lower when being crystalline for ensuring that the thermoplastic resin easily melt-knead with the mesophase pitch.

<Resin Composite Fiber>

As a method of producing the resin composite fiber from the mesophase pitch composition, a method may be exemplified in which the mesophase pitch composition is melt-spun using a spinning nozzle. Thus, an initial orientation property of the mesophase pitch contained in the resin composite fiber can be enhanced. The initial orientation property may affect the fiber diameter and fiber length of the fibrous carbon to be finally obtained.

An average single yarn diameter of the resin composite fiber is preferably 10 to 200 µm. If the average single yarn diameter exceeds 200 µm, it becomes difficult for a reactive gas to come into contact with the mesophase pitch at which the reactive gas is dispersed inside the resin composite fiber in the stabilization step described later. Thus, productivity decreases. On the other hand, if the average single yarn diameter is less than 10 µm, there is a possibility that strength of the resin composite fiber decreases and process stability decreases.

The temperature at the time of producing (spinning) the resin composite fiber from the mesophase pitch composition is required to be higher than the melting temperature of the mesophase pitch, and is preferably 150 to 400° C. When the temperature exceeds 400° C., a deformation relaxation rate of the mesophase pitch increases, so that it is difficult to maintain the shape of a fiber.

The resin composite fibers obtained through these steps are formed into fibers in a state where the mesophase pitch is microdispersed in the thermoplastic resin during kneading.

<Stabilization Step>

The resin composite stabilized fiber may be produced by bringing a reactive gas containing oxygen into contact with the resin composite fiber described above. By bringing the reactive gas into contact with the resin composite fiber, the mesophase pitch contained in the resin composite fiber is stabilized (infusibilized).

In this step, the stabilization step of bringing a gas containing oxygen into contact with the resin composite fiber to stabilize the mesophase pitch is performed. Examples of the gas containing oxygen include air.

In the stabilization step, the reactive gas may contain an oxidizing gas or an inert gas other than oxygen. Examples of the oxidizing gas include nitrogen dioxide, nitrogen monoxide, and sulfur dioxide, and examples of the inert gas include carbon dioxide, nitrogen, and argon. The preferred oxygen concentration is 0.1 to 21% by volume although it varies depending on the type of mesophase pitch and the fiber diameter of the resin composite fiber.

According to the present invention, the mesophase pitch is stabilized in the state of the resin composite fiber combined with the thermoplastic resin. Thus, the process stability is not impaired even if the fiber diameter of the mesophase pitch is reduced as compared with the case of stabilizing the fiber formed by melt-spinning only the mesophase pitch.

In the stabilization, treatment may be performed, for example, in a temperature range of 25 to 400° C. for 10 minutes to 10 hours.

<Removing Step>

The thermoplastic resin is removed from the resin composite stabilized fiber to obtain a fibrous carbon precursor. Examples of the method of decomposing and removing the thermoplastic resin include a method in which the thermoplastic resin is removed using a solvent, and a method in which the thermoplastic resin is thermally decomposed at, for example, 350 to 600° C. to be removed Among these methods, the method of removing the thermoplastic resin using the solvent has a problem that process cost increases because, for example, a large amount of solvent is required and recovery is also required. Therefore, removal by thermal decomposition in the latter method is realistic and preferable.

When the thermoplastic resin is removed by thermal decomposition, the removal may be performed under reduced pressure. The thermoplastic resin may be more efficiently removed by the thermal decomposition under reduced pressure.

<High-Temperature Heating Step>

The fibrous carbon is obtained by heating a fibrous carbon precursor under an inert gas atmosphere to carbonize or graphitize the fibrous carbon precursor. This step affects a crystal structure of the fibrous carbon, and in particular, the distance (d002) between the graphite sheets, the crystallite size (Lc002), the conductivity (the powder volume resistivity), and the compression recovery degree can be adjusted.

Examples of the inert gas used in the high temperature heating step include nitrogen and argon. The oxygen concentration in the inert gas is preferably 20 volume ppm or less. The heating and firing temperature during carbonization and/or graphitization is preferably 500 to 3500° C. A heating time is preferably 0.1 to 24 hours.

As a container used in the high temperature heating step, a container made of metal, ceramic, or graphite may be used depending on the heating temperature; however, a cruciblelike container made of graphite is preferable.

(4-2) Carbon-Based Conductive Aid Other than Fibrous Carbon

Examples of a carbon-based conductive agent other than the fibrous carbon include carbon black, acetylene black, scaly carbon, graphene, and graphite. These carbon-based conductive aids may be used alone or in combination of two or more thereof.

The shape of these carbon-based conductive aids is not particularly limited, and is preferably a spherical particle form such as carbon black and acetylene black. The average particle diameter (primary particle diameter) of the carbon-based conductive aid is preferably 10 to 200 nm, and more preferably 20 to 100 nm. The aspect ratio of these carbon-based conductive aids is 10 or less, preferably 1 to 5, and more preferably 1 to 3.

The content of the carbon-based conductive aid other than the fibrous carbon in the active material layer of the present invention is preferably 0.1 to 4% by mass, more preferably 0.5 to 3% by mass, and still more preferably 1 to 2% by mass with respect to the active material layer.

When the conductive aid contains the fibrous carbon and the spherical particles, from the viewpoint of achieving both the electron conductivity and the ionic conductivity, the mass ratio of the fibrous carbon is preferably 20% by mass or more and 99% by mass or less, and the mass ratio of the spherical particles is 1% by mass or more and 80% by mass or less. More preferably, the mass ratio of the fibrous carbon is 40% by mass or more and 99% by mass or less, and the mass ratio of the spherical particles is 1% by mass or more and 60% by mass or less. The lower limit of the mass ratio of the fibrous carbon is preferably 50% by mass or less, more preferably 60% by mass or less, more preferably 70% by mass or less, more preferably 80% by mass or less, and particularly preferably 85% by mass or less. The upper limit of the mass ratio of the spherical particles is preferably 50% by mass or more, more preferably 40% by mass or more, more preferably 30% by mass or more, more preferably 20% by mass or more, and particularly preferably 15% by mass or more. It is considered that a small amount of spherical particles also act as a cushion function of buffering the volume change of the active material due to repetition of the charge-discharge cycle.

(5) Method of Producing Active Material Layer for all-Solid-State Lithium Secondary Battery For the active material layer of the present invention, for example, a slurry in which the active material, the solid electrolyte, the conductive aid, and the like described above and a solvent are mixed is provided. The slurry is attached onto a current collector by coating or the like, the solvent is then dried and removed, and pressure molding is performed by pressing as necessary, whereby the active material layer may be produced. Alternatively, the active material, the solid electrolyte, the conductive aid, and the like are mixed in powder form, and pressure molding is performed by pressing, whereby the active material layer may be produced.

(6) All-Solid-State Lithium Secondary Battery

The all-solid-state lithium secondary battery includes the positive electrode active material layer, a solid electrolyte layer made of a solid electrolyte, and the negative electrode active material layer, and the positive electrode active material layer and the negative electrode active material layer are arranged so as to sandwich the solid electrolyte layer. Usually, a positive electrode current collector is provided on the positive electrode active material layer and a negative electrode current collector is provided on the negative electrode active material layer so as to sandwich them, and, in addition, a battery case is disposed so as to cover the whole thereof.

The all-solid-state lithium secondary battery of the present invention is not particularly limited as long as it includes at least the active material layer and the solid electrolyte layer, and usually includes the positive electrode current collector, the negative electrode current collector, the battery case, and the like as described above.

In the all-solid-state lithium secondary battery, the active material layer and the solid electrolyte layer may not have a clear interface. When there is no clear interface, a layer in which 10% by volume or more of the active material exists within 10 μm in the thickness direction can be regarded as the active material layer.

EXAMPLES

Hereinafter, the present invention will be described more specifically with reference to examples, but the present invention is not limited to these examples. Various kinds of measurements and analyses in examples were performed in accordance with the following methods, respectively.
(Confirmation of Shape of Fibrous Carbon)

For the effective fiber length and the fiber length of the fibrous carbon, a dilute dispersion prepared by dispersing the fibrous carbon (sample) in 1-methyl-2-pyrrolidone was measured using a particle size distribution meter for image analysis (model IF-200 nano, manufactured by JASCO International Co., Ltd.). The average effective fiber length and the average fiber length of the fibrous carbon are average values on a volume basis.

The fiber diameter of the fibrous carbon was observed and photographed using a scanning electron microscope (S-2400 manufactured by Hitachi, Ltd.), the fiber diameter was measured at 300 places randomly selected from the obtained electron micrograph, and an average value of all the measurement results (n=300) was taken as the average fiber diameter.

The CV value was obtained from the average value and a standard deviation. In addition, the average aspect ratio was calculated from the average effective fiber length and the average fiber diameter.
(X-Ray Diffraction Measurement of Carbon Fiber)

X-ray diffraction measurement was performed in accordance with the JIS R 7651 method using RINT-2100 manufactured by Rigaku Corporation, and a lattice spacing (d002) and the crystallite size (Lc002) were measured.
(Method of Measuring Powder Volume Resistivity)

The powder volume resistivity was measured with a four-probe-type electrode unit under a load of 0.02 to 2.50 kN using a powder resistance system (MCP-PD51) manufactured by Mitsubishi Chemical Analytech Co., Ltd. The powder volume resistivity of the sample was defined as volume resistivity values at packing densities of 0.8 g/cm$^3$ and 0.5 g/cm$^3$ from a relationship diagram of a volume resistivity with a change in packing density.
(Method of Measuring Compression Recovery Degree)

The compression recovery degree was measured with a four-probe-type electrode unit under a load of 0.02 to 0.40 kN using a powder resistance system (MCP-PD51) manufactured by Mitsubishi Chemical Analytech Co., Ltd. The compression recovery degree is calculated from the volume resistivity at the time of compressing the sample and the volume resistivity at the time of recovery when the compression is released (compression recovery degree (%)=volume resistivity during recovery/volume resistivity during compression×100). The volume resistivity during compression was obtained by calculating the amount of change in volume resistivity at 0.1 MPa and 1.0 MPa from a relationship diagram of the volume resistivity with a change in pressure when a load was applied from 0.02 kN to 0.40 kN. The volume resistivity during recovery was obtained by calculating the amount of change in volume resistivity at 0.1 MPa and 1.0 MPa from a relationship diagram of the volume resistivity with the change in pressure when the load was released from 0.40 kN to 0.02 kN.
(Method of Measuring Specific Surface Area)

In the measurement of the specific surface area, the specific surface area was calculated using a specific surface area measuring apparatus (TriStar II 3020) manufactured by Shimadzu Corporation by the BET equation in accordance with a method defined in JIS Z 8830.
(Method of Producing Mesophase Pitch)

A coal tar pitch freed of a quinoline-insoluble component and having a softening point of 80° C. was hydrogenated in the presence of a Ni—Mo based catalyst at a pressure of 13 MPa and a temperature of 340° C. to obtain a hydrogenated coal tar pitch. The hydrogenated coal tar pitch was heat-treated at 480° C. under atmospheric pressure, and then decompressed to remove a low-boiling-point component, so that a mesophase pitch was obtained. The mesophase pitch was filtered at a temperature of 340° C. using a filter to remove foreign matters in the pitch, whereby a purified mesophase pitch was obtained.
(Method of Producing Fibrous Carbon (CNF) (i))

60 parts by mass of linear low-density polyethylene (EXCEED (registered trademark) 1018 HA, manufactured by Exxon Mobil Corporation, MFR=1 g/10 min) as a thermoplastic resin and 40 parts by mass of the mesophase pitch (mesophase ratio 90.9%, softening point 303.5° C.) obtained in (Method of producing mesophase pitch) were melt-kneaded in a co-rotating twin-screw extruder ("TEM-26SS" manufactured by TOSHIBA MACHINE CO., LTD., at a barrel temperature of 300° C. under a nitrogen gas stream) to prepare a mesophase pitch composition.

Next, the mesophase pitch composition was molded by a melt spinning machine into multifilament with a fiber diameter of 90 μm using a circular nozzle having a diameter of 0.2 mm and an introduction angle of 60°. The nozzle temperature was 360° C., the discharge amount per spinning hole was 16.8 g/nozzle/hour, and the draft ratio as a ratio of the discharge linear velocity and the take-up rate was 5.

0.1 kg of a mesophase pitch-containing fiber bundle obtained in the above operation was used and held at 215° C. for 3 hours in air to stabilize the mesophase pitch, and thus to obtain a stabilized mesophase pitch-containing fiber bundle. The stabilized mesophase pitch-containing fiber bundle was placed in a vacuum gas purging furnace, the furnace was purged with nitrogen, and then decompressed to 1 kPa, and the temperature was elevated to 500° C. at a temperature elevation rate of 5° C./min under the reduced pressure, and held at 500° C. for 1 hour to remove the thermoplastic resin, thereby obtaining a stabilized fiber.

Then, the stabilized fiber was carbonized by being held at 1000° C. for 30 minutes under a nitrogen atmosphere, and further graphitized by being heated to 1500° C. and held for 30 minutes under an argon atmosphere.

Then, the graphitized carbon fiber aggregate was pulverized to obtain a powdery carbon fiber aggregate. The carbon fiber had a linear structure without branching.

In the obtained carbon fiber, no branching was observed by SEM photograph (the degree of branching was less than 0.01 pieces/μm). The crystallite spacing d002 was 0.3441 nm, the crystallite size Lc002 was 5.4 nm, the average fiber diameter was 270 nm, the average effective fiber length was 90 μm, the CV value of the fiber diameter was 56%, the CV value of the effective fiber length was 83%, the average fiber length was 136 μm, the average aspect ratio was 333, a ratio of the average effective fiber length/the average fiber length was 0.657, the powder volume resistivity at 0.5 g/cm$^3$ was 0.0677 Ω·cm, the powder volume resistivity at 0.8 g/cm$^3$ was 0.0277 Ω·cm, the compression recovery degree was 59%, and the specific surface area was 10 m$^2$/g. The metal content was less than 20 ppm.

The obtained carbon fiber was excellent fibrous carbon having a large d002, a large aspect ratio, a long effective fiber length, and high conductivity. Hereinafter, the fibrous carbon may be abbreviated as "CNF (i)".
(Method of Producing Solid Electrolyte (LPS))

Li$_2$S and P$_2$S$_5$ were mixed at a molar ratio of 75:25, and a ball mill treatment (100 cycles in which after rotation at 500 rpm for 12 minutes, the rotation was paused for 8 minutes) was performed to prepare a sulfide-based solid electrolyte (LPS). Hereinafter, the sulfide-based solid electrolyte may be abbreviated as "LPS".

Spherical particles: acetylene black (hereinafter, may be abbreviated as "AB". "DENKA BLACK" (registered trademark) manufactured by Denka Company Limited, 75% pressed product, average particle diameter: 0.036 μm, specific surface area: 65 m²/g)

Example 1

(Method of Preparing Positive Electrode Composite)

In an argon atmosphere, 36 parts by mass of LPS, 62 parts by mass of the positive electrode active material, and 2 parts by mass of fibrous carbon (CNF (i)) were mixed in an agate mortar. As the positive electrode active material, $LiNi_{1/3}Co_{1/3}Mn_{1/3}O_2$ (average particle diameter: 10.18 μm, $D_{50}$: 10.26 μm, powder electrical conductivity: $5.46 \times 10^{-7}$ @2.47 g/cm³, hereinafter abbreviated as "NCM") was used.

(Electrical Conductivity in Film Thickness Direction of Positive Electrode Active Material Layer)

The positive electrode composite prepared as described above was placed in an electrical conductivity measuring cell, and the electrical conductivity in the film thickness direction was measured while 100 MPa was applied from above and below. The results are shown in Table 1.

(Method of Preparing Cell for all-Solid-State Battery Evaluation)

A cell container for all-solid-state battery evaluation was filled with 10 parts by mass of LPS, and pressed three times at 100 MPa to form a solid electrolyte layer. A positive electrode active material layer was formed on one surface of the solid electrolyte layer by adding 1 part by mass of the positive electrode composite, pressing three times at 100 MPa, and leaving to stand for 30 seconds. A Li foil (thickness: 47 μm) and an In foil (thickness: 50 μm) as the negative electrode active materials were set on an opposite surface of the solid electrolyte layer, and pressed at 80 MPa, and finally the cell was fixed with a bolt to prepare a cell for all-solid-state battery evaluation in which a pressurized state of 8N was maintained. The thicknesses of the positive electrode active material layer and the solid electrolyte layer were as shown in Table 1.

(Density and Volume Ratio of Active Material Layer)

The density of the active material layer was calculated from a total weight of the composition of the active material layer and the volume of the active material layer. A volume ratio of each composition in the active material layer was calculated from the true density and filling amount of each composition and the volume of the active material layer, and the remaining volume was calculated as a gap.

(Density and Porosity of Solid Electrolyte Layer)

The density and porosity of the solid electrolyte were calculated from the mass of the solid electrolyte filled and the volume of the solid electrolyte.

(Initial Charge-Discharge Measurement)

Using the cell prepared as described above, an initial charge-discharge measurement test was performed at 70° C. In a charge-discharge condition, after constant current charging at 0.05 C up to 3.7 V, constant voltage charging was performed for 4 hours, and constant current discharging at 0.05 C was performed up to 2.0 V. A charge capacity, a discharge capacity, and charge/discharge efficiency are shown in the table.

(Rate Characteristic Evaluation)

Discharge rate characteristics were measured using a cell charged and discharged for 1 cycle as described above. A charge-discharge test was always performed at 70° C. Measurement conditions of the discharge rate characteristics are as follows. As a charge condition, after constant current charging at 0.05 C up to 3.7 V, the charging was switched to discharging. As a discharge condition, a lower limit voltage was set to 2.0 V, and constant current discharging was performed at each discharge rate. The discharge rate was increased stepwise like 0.1 C→0.2 C→0.5 C→1 C. The discharge capacity (mAh/g) per weight of the active material at each discharge rate is shown in the table. The larger the discharge capacity, the higher the output of the all-solid-state lithium secondary battery.

(Measurement of Alternating Current Impedance)

An alternating current impedance of each cell was measured using a potentiostat/galvanostat (VersaSTAT4 manufactured by Princeton Applied Research). The measurement was always performed at 70° C. In the measurement, pre-cycle was performed with a charge-discharge device similarly to measurement for the discharge rate characteristics, and a cell in a charged state was used. The reaction resistance (Ω) of each cell is shown in the table. The lower the reaction resistance, the higher the output of the all-solid-state lithium secondary battery in which both the electron conductivity and the ionic conductivity are achieved.

Example 2

The same procedure as in Example 1 was carried out except that 1.6 parts by mass of CNF (i) and 0.4 parts by mass of AB were used in place of 2 parts by mass of CNF (i) in Example 1.

Example 3

The same procedure as in Example 1 was carried out except that 1 part by mass of CNF (i) and 1 part by mass of AB were used in place of 2 parts by mass of CNF (i) in Example 1.

Comparative Example 1

The same procedure as in Example 1 was carried out except that 2 parts by mass of AB was used in place of 2 parts by mass of CNF (i) in Example 1.

Example 4

The same procedure as in Example 1 was carried out except that the electrical conductivity of the positive electrode active material layer of Example 1 in the film thickness direction (the press pressure was changed from 100 MPa to 500 MPa) and the method of preparing a cell for all-solid-state battery evaluation (the press pressure after addition of the positive electrode composite was changed from 100 MPa to 500 MPa) were changed.

Example 5

The same procedure as in Example 4 was carried out except that 1.6 parts by mass of CNF (i) and 0.4 parts by mass of AB were used in place of 2 parts by mass of CNF (i) in Example 4.

Example 6

The same procedure as in Example 4 was carried out except that 1 part by mass of CNF (i) and 1 part by mass of AB were used in place of 2 parts by mass of CNF (i) in Example 4.

Comparative Example 2

The same procedure as in Example 4 was carried out except that 2 parts by mass of AB was used in place of 2 parts by mass of CNF (i) in Example 4.

Example 7

The same procedure as in Example 1 was carried out except that the method of preparing the positive electrode composite in Example 1 was changed as follows.

In an argon atmosphere, 35 parts by mass of LPS, 60 parts by mass of the positive electrode active material, and 5 parts by mass of CNF (i) were mixed in an agate mortar. As the positive electrode active material, $LiNi_{1/3}Co_{1/3}Mn_{1/3}O_2$ ($D_{50}$: 10.26 μm) was used.

Example 8

The same procedure as in Example 7 was carried out except that 4 parts by mass of CNF (i) and 1 part by mass of AB were used in place of 5 parts by mass of CNF (i) in Example 7.

Example 9

The same operation as in Example 1 was performed except that the surface of the positive electrode active material was coated with $LiNbO_3$ (sometimes referred to as "surface coating NCM").

(Method of Producing Fibrous Carbon (CNF) (ii))

A carbon fiber was obtained in the same manner as the method of producing the fibrous carbon (CNF (i)) except that a graphitization temperature was 1700° C.

In the obtained carbon fiber, no branching was observed by SEM photograph (the degree of branching was less than 0.01 pieces/μm). The crystallite spacing d002 was 0.3432 nm, the crystallite size Lc002 was 8.7 nm, the average fiber diameter was 326 nm, the average effective fiber length was 81 μm, the CV value of the fiber diameter was 56%, the CV value of the effective fiber length was 80%, the average fiber length was 117 μm, the average aspect ratio was 248, a ratio of the average effective fiber length/the average fiber length was 0.696, the powder volume resistivity at 0.5 g/cm³ was 0.0602 Ω·cm, the powder volume resistivity at 0.8 g/cm³ was 0.0205 Ω·cm, the compression recovery degree was 73%, and the specific surface area was 9 m²/g.

The obtained carbon fiber was excellent fibrous carbon having a large d002, a large aspect ratio, a long effective fiber length, and high conductivity. Hereinafter, the fibrous carbon may be abbreviated as "CNF (ii)".

Example 10

The same procedure as in Example 4 was carried out except that $LiNi_{1/3}Co_{1/3}Mn_{1/3}O_2$ (average particle diameter: 7.14 μm, $D_{50}$: 6.55 μm, hereinafter abbreviated as "NCM (ii)") was used as the positive electrode active material and CNF (ii) was used in place of CNF (i).

From the results of Example 3 and Example 6, it is found that the reaction resistance of Example 3 is small and the rate characteristics are good although the mass ratios of the respective members constituting the active material layer are equivalent. That is, it is suggested that the porosity is more preferably 9% by volume or more, and it is presumed that the gap buffers the volume change accompanying the expansion and contraction of the active material accompanying the charge-discharge reaction.

From the results of Examples 1 to 3 and Comparative Example 1, it can be seen that by containing the fibrous carbon as the conductive aid, the reaction resistance is small, and the rate characteristics are good. It is suggested that the conductive path is maintained even when the volume change accompanying the expansion and contraction of the active material accompanying the charge-discharge reaction occurs, and it is presumed that this is an effect that a long-distance conductive path is formed by the fibrous carbon.

From the results of Examples 4, 5, and 6 and Comparative Example 2, in the case of the active material layer formed at a press pressure of at least 500 MPa, the porosity increases as the content of the fibrous carbon increases. It is presumed that the fibrous carbon contributes to the maintenance and formation of the gap when the press pressure increases.

TABLE 1

| | Constituent material of battery | | | | | | | | | |
|---|---|---|---|---|---|---|---|---|---|---|
| | Active material | | | Conductive aid | | | | | | Σσ: total specific surface area of conductive aid (m²/g) |
| | | | | Fibrous carbon | | Spherical carbon | | | Ratio of conductive aid | |
| | Type | Ra: average particle diameter (μm) | Solid electrolyte Type | Type | Re₁: average particle diameter (μm) | σ₁: specific surface area (m²/g) | Type | Re₂: average particle diameter (μm) | σ₂: specific surface area (m²/g) | Fibrous carbon | Spherical carbon | |
| Example 1 | NCM (i) | 10.18 | LPS | CNF (i) | 0.27 | 10 | — | — | — | 100 | 0 | 10 |
| Example 2 | NCM (i) | 10.18 | LPS | CNF (i) | 0.27 | 10 | AB | 0.036 | 65 | 80 | 20 | 21 |
| Example 3 | NCM (i) | 10.18 | LPS | CNF (i) | 0.27 | 10 | AB | 0.036 | 65 | 50 | 50 | 38 |
| Example 4 | NCM (i) | 10.18 | LPS | CNF (i) | 0.27 | 10 | — | — | — | 100 | 0 | 10 |
| Example 5 | NCM (i) | 10.18 | LPS | CNF (i) | 0.27 | 10 | AB | 0.036 | 65 | 80 | 20 | 21 |
| Example 6 | NCM (i) | 10.18 | LPS | CNF (i) | 0.27 | 10 | AB | 0.036 | 65 | 50 | 50 | 38 |
| Example 7 | NCM (i) | 10.18 | LPS | CNF (i) | 0.27 | 10 | — | — | — | 100 | 0 | 10 |
| Example 8 | NCM (i) | 10.18 | LPS | CNF (i) | 0.27 | 10 | AB | 0.036 | 65 | 80 | 20 | 21 |
| Example 9 | Surface coating NCM | 10.18 | LPS | CNF (i) | 0.27 | 10 | — | — | — | 100 | 0 | 10 |

TABLE 1-continued

| | | | | | | | | | | | | |
|---|---|---|---|---|---|---|---|---|---|---|---|---|
| Comparative Example 1 | NCM (i) | 10.18 | LPS | — | — | — | AB | 0.036 | 65 | 0 | 100 | 65 |
| Comparative Example 2 | NCM (i) | 10.18 | LPS | — | — | — | AB | 0.036 | 65 | 0 | 100 | 65 |
| Example 10 | NCM (ii) | 7.14 | LPS | CNF (ii) | 0.33 | 9 | | | | 100 | 0 | 9 |

| | Electrode composite layer | | | | | | | | |
|---|---|---|---|---|---|---|---|---|---|
| | Electrode composite layer composition (mass %) | | | | | Volume ratio (including gap) (vol %) | | | |
| | $X_a$: active material | $X_{e1}$: Solid electrolyte | $X_{e2}$: fibrous carbon | spherical carbon | $\Sigma$ (Xe/Re)/(Xa/Ra) | True Density (g/cc) | NCM | Solid electrolyte | CNF |
| Example 1 | 62 | 36 | 2 | 0 | 1.22 | 3.11 | 26 | 36 | 1.9 |
| Example 2 | 62 | 36 | 1.6 | 0.4 | 2.80 | 3.11 | 30 | 41 | 1.7 |
| Example 3 | 62 | 36 | 1 | 1 | 5.17 | 3.11 | 24 | 32 | 0.9 |
| Example 4 | 62 | 36 | 2 | 0 | 1.22 | 3.11 | 34 | 46 | 2.5 |
| Example 5 | 62 | 36 | 1.6 | 0.4 | 2.80 | 3.11 | 36 | 49 | 2.1 |
| Example 6 | 62 | 36 | 1 | 1 | 5.17 | 3.11 | 38 | 51 | 1.4 |
| Example 7 | 60 | 35 | 5 | 0 | 3.14 | 3.07 | 27 | 37 | 5.0 |
| Example 8 | 60 | 35 | 4 | 1 | 7.23 | 3.07 | 27 | 37 | 4.1 |
| Example 9 | 62 | 36 | 2 | 0 | 1.22 | 3.11 | 26 | 36 | 1.9 |
| Comparative Example 1 | 62 | 36 | 0 | 2 | 9.12 | 3.11 | 26 | 35 | 0.0 |
| Comparative Example 2 | 62 | 36 | 0 | 2 | 9.12 | 3.11 | 40 | 54 | 0.0 |
| Example 10 | 62 | 36 | 2 | 0 | 0.71 | 3.11 | 35 | 47 | 2.5 |

| | Electrode composite layer | | | | | | Solid electrolyte layer | | |
|---|---|---|---|---|---|---|---|---|---|
| | Volume ratio (including gap) (vol %) | | Pressure (Mpa) | Electrical conductivity (S/cm) | Thickness (μm) | Density (g/cc) | Thickness (μm) | Density (g/cc) | Porosity (vol %) |
| | AB | Gap | | | | | | | |
| Example 1 | 0.0 | 36 | 100 | $2.0 \times 10^{-2}$ | 95 | 1.98 | 1345 | 1.43 | 28 |
| Example 2 | 0.4 | 27 | 100 | $1.5 \times 10^{-2}$ | 86 | 2.26 | 1281 | 1.49 | 29 |
| Example 3 | 0.9 | 42 | 100 | Unmeasured | 110 | 1.79 | 1250 | 1.54 | 23 |
| Example 4 | 0.0 | 18 | 500 | $1.0 \times 10^{-1}$ | 76 | 2.55 | 1085 | 1.89 | 5 |
| Example 5 | 0.5 | 12 | 500 | $9.0 \times 10^{-2}$ | 73 | 2.73 | 1065 | 1.92 | 4 |
| Example 6 | 1.4 | 8 | 500 | $7.0 \times 10^{-4}$ | 66 | 2.85 | 1065 | 1.92 | 4 |
| Example 7 | 0.0 | 32 | 100 | $8.0 \times 10^{-1}$ | 92 | 2.1 | 1245 | 1.54 | 23 |
| Example 8 | 1.0 | 31 | 100 | $5.5 \times 10^{-1}$ | 92 | 2.13 | 1310 | 1.46 | 27 |
| Example 9 | 0.0 | 36 | 100 | Unmeasured | 102 | 1.98 | 1330 | 1.42 | 29 |
| Comparative Example 1 | 1.9 | 38 | 100 | Unmeasured | 100 | 1.94 | 1283 | 1.5 | 29 |
| Comparative Example 2 | 2.9 | 4 | 500 | $2.0 \times 10^{-2}$ | 66 | 3 | 1017 | 1.89 | 10 |
| Example 10 | 0.0 | 16 | 500 | Unmeasured | 73 | 2.62 | 997 | 1.92 | 9 |

| | Battery evaluation | | | | | | | | | |
|---|---|---|---|---|---|---|---|---|---|---|
| | Initial charge-discharge | | | Rate characteristic evaluation | | | | | | Impedance Reaction resistance |
| | Charge | Discharge | Efficiency (%) | 0.1 C | 0.2 C | 0.5 C | 1 C | 2 C | 3 C | |
| Example 1 | 141 | 93 | 66 | 50 | 40 | 22 | 3.7 | 0 | | 695 |
| Example 2 | 149 | 88 | 59 | 34.2 | 20.2 | 4.7 | 0 | | | 1201 |
| Example 3 | 141 | 85 | 60 | 28 | 19 | 3.5 | 0 | | | 1179 |
| Example 4 | 153 | 79 | 52 | 16 | 10.4 | 3.3 | 0.3 | 0 | | 1243 |
| Example 5 | 160 | 95 | 59 | 20.5 | 14.6 | 6.1 | 1.1 | 0 | | 661 |
| Example 6 | 157 | 72 | 46 | 1.9 | 0.5 | 0 | 0 | | | 2168 |
| Example 7 | 150 | 85 | 57 | 23.1 | 11.8 | 1.9 | 0 | | | 1329 |
| Example 8 | 185 | 101 | 55 | 19.3 | 5.8 | 0.2 | 0 | | | 1968 |
| Example 9 | 145 | 118 | 81 | 103 | 94 | 78 | 61 | 39 | 16 | 83 |
| Comparative Example 1 | 172 | 86 | 50 | 4.5 | 1.1 | 0 | 0 | | | 3127 |
| Comparative Example 1 | 167 | 64 | 38 | 0.2 | 0 | 0 | 0 | | | 5121 |
| Example 10 | 165 | 122 | 74 | 111 | 89 | 61 | 29 | 0 | | 286 |

The invention claimed is:

1. An active material layer for an all-solid-state lithium secondary battery comprising at least an active material, a conductive aid, and a solid electrolyte, wherein
the active material layer has a gap,
a ratio of the conductive aid in the active material layer is 0.1% by mass or more and less than 5.0% by mass,
the conductive aid contains fibrous carbon having an average fiber diameter of 10 to 900 nm, and a ratio of the fibrous carbon in the conductive aid is 20% by mass or more,
wherein a porosity of the active material layer is 5.0% by volume or more and 50% by volume or less.

2. The active material layer for an all-solid-state lithium secondary battery according to claim 1, wherein electrical conductivity in a film thickness direction of the active material layer is $1.0 \times 10^{-3}$ S/cm or more.

3. The active material layer for an all-solid-state lithium secondary battery according to claim 1, wherein a volume ratio of the conductive aid in the active material layer is 0.5% by volume or more and 4.0% by volume or less.

4. The active material layer for an all-solid-state lithium secondary battery according to claim 1, wherein the volume ratio of the fibrous carbon in the active material layer is 0.5% by volume or more and 4.0% by volume or less.

5. The active material layer for an all-solid-state lithium secondary battery according to claim 1, wherein the conductive aid comprises the fibrous carbon and spherical particles.

6. The active material layer for an all-solid-state lithium secondary battery according to claim 1, wherein a crystallite spacing (d002) of the fibrous carbon measured by an X-ray diffraction method is 0.3400 nm or more.

7. The active material layer for an all-solid-state lithium secondary battery according to claim 1, wherein a coefficient of variation of an effective fiber length of the fibrous carbon is 35% or more and 90% or less.

8. The active material layer for an all-solid-state lithium secondary battery according to claim 1, wherein a compression recovery degree of the fibrous carbon represented by the following Formula (1) is 50% or more and 90% or less:

compression recovery degree (%)=volume resistivity during recovery/volume resistivity during compression×100   Formula (1).

9. The active material layer for an all-solid-state lithium secondary battery according to claim 1, wherein a specific surface area of the conductive aid is 1 $m^2$/g or more and 50 $m^2$/g or less.

10. The active material layer for an all-solid-state lithium secondary battery according to claim 1, wherein the active material and the conductive aid satisfy the following Formula (2):

$\Sigma(Xe/Re)/\Sigma(Xa/Ra)<9$   Formula (2)

wherein Xe is a content (% by mass) of the conductive aid contained in the active material layer,
Re is an average particle diameter (average fiber diameter) (μm) of the conductive aid contained in the active material layer,
Ra is an average particle diameter (μm) of the active material contained in the active material layer, and
Xa is a content (% by mass) of the active material contained in the active material layer.

11. An all-solid-state lithium secondary battery comprising the active material layer according to claim 1 and a solid electrolyte.

12. The active material layer for an all-solid-state lithium secondary battery according to claim 3, wherein electrical conductivity in a film thickness direction of the active material layer is $1.0 \times 10^{-3}$ S/cm or more.

* * * * *